US010802642B2

(12) United States Patent
Huang (10) Patent No.: US 10,802,642 B2
(45) Date of Patent: Oct. 13, 2020

(54) WEARABLE DEVICE AND METHOD OF CONTROLLING THE SAME

(71) Applicant: BOE TECHNOLOGY GROUP CO., LTD., Beijing (CN)

(72) Inventor: Zicheng Huang, Beijing (CN)

(73) Assignee: BOE TECHNOLOGY GROUP CO., LTD, Beijing (CN)

( * ) Notice: Subject to any disclaimer, the term of this patent is extended or adjusted under 35 U.S.C. 154(b) by 181 days.

(21) Appl. No.: 15/324,903

(22) PCT Filed: Jan. 4, 2016

(86) PCT No.: PCT/CN2016/070026
§ 371 (c)(1),
(2) Date: Jan. 9, 2017

(87) PCT Pub. No.: WO2017/036060
PCT Pub. Date: Mar. 9, 2017

(65) Prior Publication Data
US 2017/0205938 A1  Jul. 20, 2017
US 2018/0074640 A9  Mar. 15, 2018

(30) Foreign Application Priority Data

Aug. 31, 2015  (CN) .......................... 2015 1 0548945

(51) Int. Cl.
*G06F 3/041* (2006.01)
*G06F 3/0487* (2013.01)
(Continued)

(52) U.S. Cl.
CPC ............ *G06F 3/0416* (2013.01); *G06F 1/163* (2013.01); *G06F 3/041* (2013.01); *G06F 3/0487* (2013.01);
(Continued)

(58) Field of Classification Search
None
See application file for complete search history.

(56) References Cited

U.S. PATENT DOCUMENTS

2015/0094914 A1*  4/2015  Abreu ................ B60H 1/00742
                                                    701/41
2016/0166157 A1*  6/2016  Naghavi .............. A61B 5/0402
                                                    600/324
2016/0321403 A1* 11/2016  Wang ..................... G16H 50/20

FOREIGN PATENT DOCUMENTS

CN           102939519 A        2/2013
CN           103491260 A        1/2014
(Continued)

OTHER PUBLICATIONS

PCT Written Opinion, Application No. PCT/CN2016/070026, dated May 31, 2016, 6 pps.: with EN Translation.
(Continued)

*Primary Examiner* — Ifedayo B Iluyomade
(74) *Attorney, Agent, or Firm* — Armstrong Teasdale LLP (57) ABSTRACT

The present disclosure discloses a wearable device and method of controlling the same, the wearable device including a thermal sensing acquisition module for receiving a touch operation by a user and acquiring a thermal sensing distribution curve of the touch operation as a current thermal sensing distribution curve, a thermal sensing processing module for determining a function corresponding to the current thermal sensing distribution curve as a current function based on the current thermal sensing distribution curve and preset corresponding relationships between thermal sensing distribution curves and functions, an instruction generating module for generating an invoking control instruction corresponding to the current function according to the current function, and an execution module for executing the invoking control instruction to perform the current (Continued)

function. The wearable device and method of controlling the same provided by the present disclosure may be applied to a wearable device where touch operations are used.

11 Claims, 7 Drawing Sheets

(51) Int. Cl.
*G06F 1/16* (2006.01)
*G01K 7/22* (2006.01)
(52) U.S. Cl.
CPC ...... *G01K 7/22* (2013.01); *G06F 2203/04104* (2013.01)

(56) References Cited

FOREIGN PATENT DOCUMENTS

| | | |
|---|---|---|
| CN | 103632055 A | 3/2014 |
| CN | 105045396 A | 11/2015 |

OTHER PUBLICATIONS

English Translation of PCT Search Report, Application No. PCT/CN2016/070026, dated May 31, 2016, 2 pps.

\* cited by examiner

WEARABLE DEVICE AND METHOD OF CONTROLLING THE SAME

CROSS REFERENCE TO RELATED APPLICATIONS

This application is a National Stage Entry of PCT/CN2016/070026 filed Jan. 4, 2016, which claims the benefit and priority of Chinese Patent Application No. 201510548945.1, filed on Aug. 31, 2015, the disclosures of which are incorporated by reference herein in their entirety as part of the present application.

BACKGROUND

Embodiments of the present disclosure relate to the field of electronic information technology, and in particular to a wearable device and method of controlling the same.

With the development of the electronic information technology, the touch technology has become an important research aspect in the development of terminals. The touch technology is employed in more and more fields such as architecture, medicine, entertainment, etc. Wearable devices are also heavily promoted because of their portability.

During operating a wearable device, a user enters a functional interface corresponding to an icon of a specific function by touching to click on the icon, and then touches to click on various options within the functional interface, so as to perform various operations. However, when the user desires that the wearable device realizes one of multiple functions, the user generally needs to touch to click multiple times for selection, and needs to accurately touch to click on the icon or another identifier corresponding to this function. As such, the touch operations are relatively complicated, and their poor accuracy leads to their low flexibility.

BRIEF DESCRIPTION

The present disclosure provides a wearable device and method of controlling the same, so as to simplify the touch operations of the wearable device and enhance the flexibility of operations.

The technical solution provided by embodiments of the present disclosure is as follows.

In an aspect, an embodiment of the present disclosure provides a wearable device, which includes a thermal sensing acquisition module configured to receive a touch operation by a user, and acquire a thermal sensing distribution curve of the touch operation as a current thermal sensing distribution curve, a thermal sensing processing module configured to determine a function corresponding to the current thermal sensing distribution curve as a current function based on the current thermal sensing distribution curve and preset corresponding relationships between thermal sensing distribution curves and functions, an instruction generating module configured to generate an invoking control instruction corresponding to the current function according to the current function, and an execution module configured to execute the invoking control instruction to perform the current function.

In another aspect, an embodiment of the present disclosure provides a method of controlling a wearable device, which includes receiving a touch operation by a user, and acquiring a thermal sensing distribution curve of the touch operation as a current thermal sensing distribution curve, determining a function corresponding to the current thermal sensing distribution curve as a current function based on the current thermal sensing distribution curve and preset corresponding relationships between thermal sensing distribution curves and functions, generating an invoking control instruction corresponding to the current function according to the current function, and executing the invoking control instruction to perform the current function.

According to the wearable device and method of controlling the same provided in embodiments of the present disclosure, the thermal sensing acquisition module receives a touch operation by a user to acquire a current thermal sensing distribution curve of the touch operation, the thermal processing module determines a current function corresponding to the current thermal sensing distribution curve, the instruction generating module generates an invoking control instruction corresponding to the current function, and the execution module performs the current function. In comparison to a wearable device which requires touching to click for selection to be performed multiple times to perform one of multiple functions, the wearable device according to the present disclosure only requires the user to perform one touch operation to perform a function thereof. The wearable device performs different functions based on different thermal sensing distribution curves of touch operations, such that the touch operations are simpler and more flexible.

BRIEF DESCRIPTION OF THE DRAWINGS

The illustrative drawings herein, provided for further understanding of the present disclosure, is used for explaining the present disclosure together with schematic embodiments and description thereof, but not to limit the present disclosure. In the drawings.

DETAILED DESCRIPTION

Detailed description is provided hereafter in combination with the accompanying drawings, to further describe the wearable device and method of controlling the same provided in embodiments of the present disclosure.

First Embodiment

Figure 1:
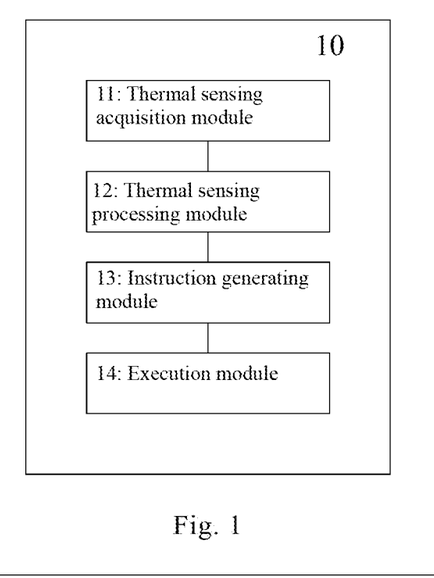
FIG. 1 is a structure view of a wearable device provided in a first embodiment of the present disclosure.

With reference to FIG. 1, a wearable device 10 provided in an embodiment of the present disclosure includes a thermal sensing acquisition module 11, a thermal sensing processing module 12, an instruction generating module 13, and an execution module 14.

The thermal sensing acquisition module 11 is used for receiving a touch operation by a user, and acquiring a thermal sensing distribution curve of the touch operation as a current thermal sensing distribution curve. The touch operation by the user may be an operation of touching on the thermal sensing acquisition module 11 with a finger by the user. The thermal sensing distribution curve represents a distribution of heat generated by the touch operation on the thermal sensing acquisition module 11. The current thermal sensing distribution curve is the thermal sensing distribution curve generated by a current touch operation by the user.

The thermal sensing processing module 12 is used for storing preset corresponding relationships between a set of different thermal sensing distribution curves and a set of functions that can be performed by the wearable device. The function corresponding to the current thermal sensing distribution curve is determined as the current function based on the current thermal sensing distribution curve and the preset corresponding relationships between the thermal sensing distribution curves and the functions.

The preset corresponding relationships between the thermal sensing distribution curves and the functions are stored in the wearable device 10. Specifically, there may be a one-to-one, one-to-many, or many-to-one corresponding relationships between the set of thermal sensing distribution curves and the set of functions.

The set of functions may include any types of functions or specified types of functions which can be performed by the wearable device 10, for example, various types of functions such as a detecting function, an output function, an input function, etc. If a certain type of functions includes more than one function, each function may be set as one mode. For example, when there are multiple detecting functions, each function may be referred to as a detecting mode.

Taking a wearable device applied in the field of medicine as an example and assuming that a function is specifically a detecting mode, a thermal sensing distribution curve B corresponds to a first detecting mode in which the pulse of the user is detected, and a thermal sensing distribution curve C corresponds to a second detecting mode in which the pulse and blood pressure of the user is detected. After the thermal sensing processing module 12 obtains the current thermal sensing distribution curve, the thermal sensing processing module 12 searches for a detecting mode corresponding to the current thermal sensing distribution curve, i.e., a current detecting mode, in the preset thermal sensing distribution curves and the detecting modes.

The present disclosure is described below by taking as an example the type of functions as a detection function which is specifically a detecting mode.

The instruction generating module 13 is used for generating an invoking control instruction corresponding to the current detecting mode based on the current detecting mode. Here, various detecting modes correspond to various invoking control instructions. The instruction generating module 13 generates a corresponding control instruction based on the current detecting mode.

The execution module 14 is used for executing the invoking control instruction and running the current detecting mode. For example, when the current detecting mode indicates detecting the pulse and blood pressure of the user, the execution module 14 executes the invoking control instruction corresponding to the current detecting mode, and the wearable device 10 detects the pulse and blood pressure of the user.

Figure 2:
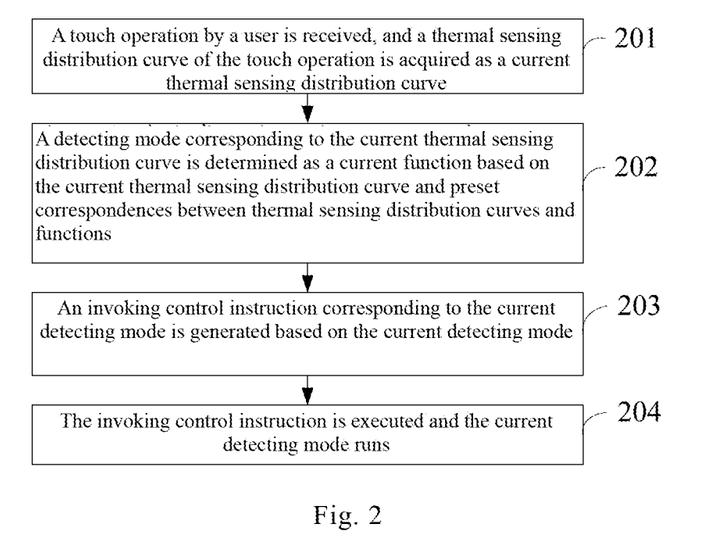
FIG. 2 is a flow chart of a method of controlling a wearable device provided in the first embodiment of the present disclosure.

With reference to FIG. 2, the method of controlling the above wearable device 10 provided in an embodiment of the present disclosure will be described below. The method of controlling includes the following:

Step 201: a touch operation by a user is received, and a thermal sensing distribution curve of the touch operation is acquired as a current thermal sensing distribution curve.

Step 202: a detecting mode corresponding to the current thermal sensing distribution curve is determined as a current detecting mode based on the current thermal sensing distribution curve and preset corresponding relationships between thermal sensing distribution curves and detecting modes.

Step 203: an invoking control instruction corresponding to the current detecting mode is generated based on the current detecting mode.

Step 204: the invoking control instruction is executed and the current detecting mode runs.

The above method of controlling a wearable device 10 may be described with reference to the above specific description of the modules of the wearable device and will not be repeated here.

According to the wearable device 10 and method of controlling the same provided in embodiments of the present disclosure, the thermal sensing acquisition module 11 receives a touch operation by a user to acquire a current thermal sensing distribution curve of the touch operation, the thermal processing module 12 determines a current detecting mode corresponding to the current thermal sensing distribution curve, the instruction generating module 13 generates an invoking control instruction corresponding to the current detecting mode, and the execution module 14 runs the current detecting mode. In comparison to a wearable device 10 which requires touching to click to be performed multiple times to perform one of various functions, the wearable device 10 according to embodiments of the present disclosure only requires the user to perform one touch operation to perform a function thereof. The wearable device 10 performs different functions based on different thermal sensing distribution curves of touch operations, such that the touch operations are simpler and more flexible.

Second Embodiment

Figure 3:
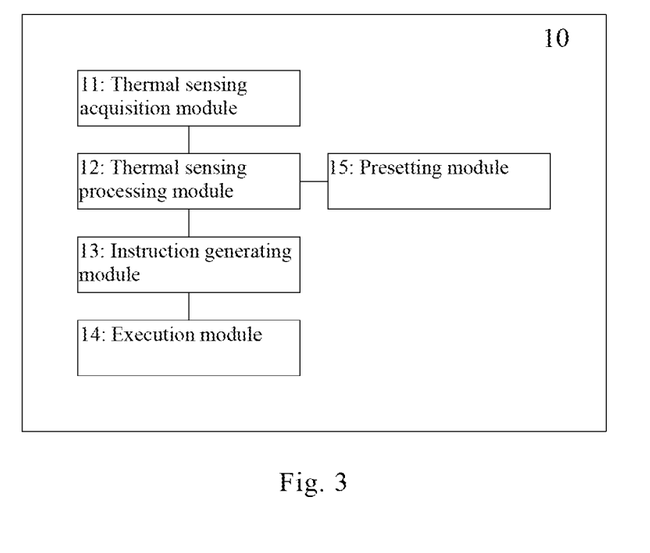
FIG. 3 is a structure view of a wearable device provided in a second embodiment of the present disclosure.

As shown in FIG. 3, the wearable device in the above embodiment may further include a presetting module 15, which is used for presetting a thermal sensing distribution curve with one peak to correspond to a first detecting mode, presetting a thermal sensing distribution with two peaks to correspond to a second detecting mode, and so on, presetting a thermal sensing distribution with N peaks to correspond to an $N^{th}$ detecting mode, where N is an integer greater than 2.

Correspondingly, the thermal sensing processing module 12 specifically determines, based on the current thermal sensing distribution curve, the current detecting mode in the following way: the thermal sensing processing module 12 is specifically used for: when the current thermal sensing distribution curve has one peak, determining the current detecting mode to be the first detecting mode, when the current thermal sensing distribution curve has two peaks, determining the current detecting mode to be the second detecting mode, and so on, when the current thermal sensing distribution curve has N peaks, determining the current detecting mode to be the $N^{th}$ detecting mode.

Figure 4:
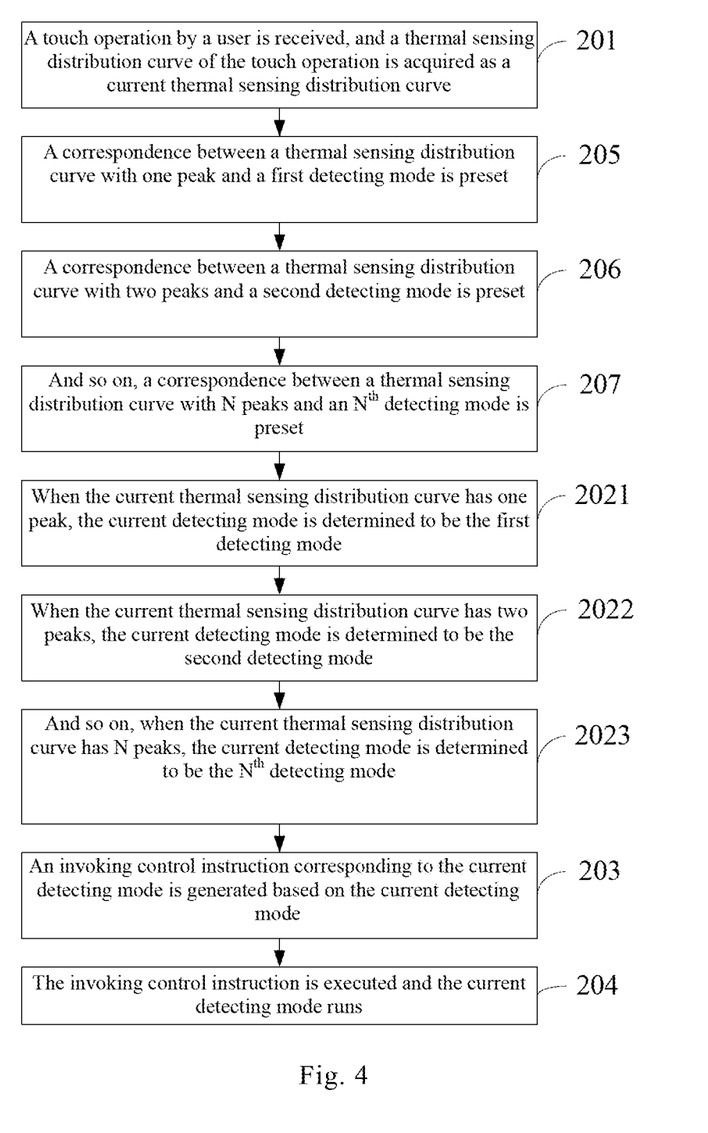
FIG. 4 is a flow chart of a method of controlling a wearable device provided in the second embodiment of the present disclosure.
Figure 5:
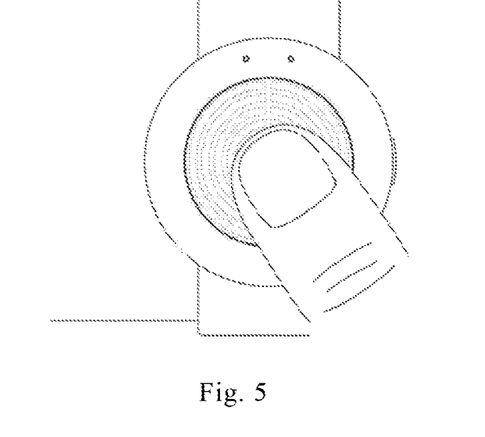
FIG. 5 is a first schematic view of a touch operation in an embodiment of the present disclosure.
Figure 6:
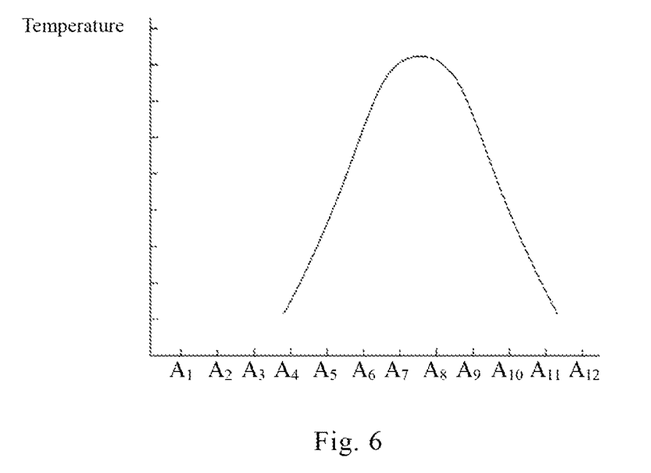
FIG. 6 is a schematic view of a thermal sensing distribution curve corresponding to FIG. 5.

With reference to FIG. 4, corresponding to the above presetting module 15 and the thermal sensing processing module 12, on the basis of the first embodiment, steps 205 to 207 may be added prior to the step 202 in the method of controlling a wearable device, and step 202 may be further sub-divided into steps 2021 to 2023:

Step 205: a correspondence between a thermal sensing distribution curve with one peak and a first detecting mode is preset. Here, the difference between thermal sensing distribution curves is caused by the distribution of a touch in a touch operation on the thermal sensing acquisition module 11, and a thermal sensing distribution curve with one peak corresponds to a first detecting mode, as shown in FIGS. 5 and 6, for example. In FIG. 5, the touch operation by the user is a touch operation with a finger, and corresponding to the touch operation in FIG. 5, the thermal sensing distribution curve in FIG. 6 has one peak.

Figure 7:
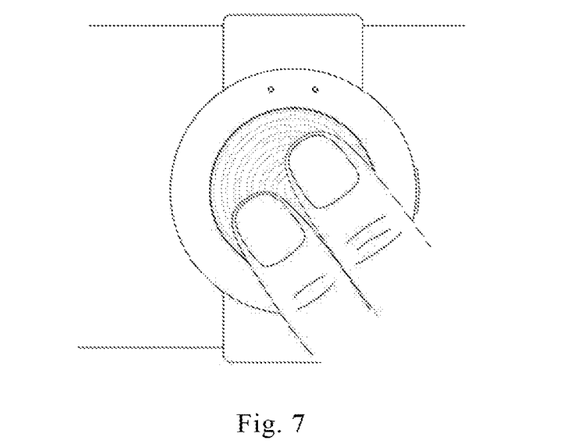
FIG. 7 is a second schematic view of a touch operation in an embodiment of the present disclosure.

Step 206: a correspondence between a thermal sensing distribution curve with two peaks and a second detecting mode is preset. For example, as shown in FIG. 7, the touch operation by the user is a touch operation with two fingers, and corresponding to the touch operation in FIG. 7, the thermal sensing distribution curve in FIG. 8 has two peaks.

Step 207: and so on, a correspondence between a thermal sensing distribution curve with N peaks and an $N^{th}$ detecting mode is preset, where N is an integer greater than 2. The specific content is similar to steps 205 and 206, and will not be repeated here.

Step 2021: when the current thermal sensing distribution curve has one peak, the current detecting mode is determined to be the first detecting mode. For example, as shown in FIGS. 5 and 6, the touch operation by the user is a touch operation with one finger and the thermal sensing distribution curve has one peak, so the first detecting mode corresponding to the thermal sensing distribution curve with one peak is determined to be the current detecting mode.

Figure 8:
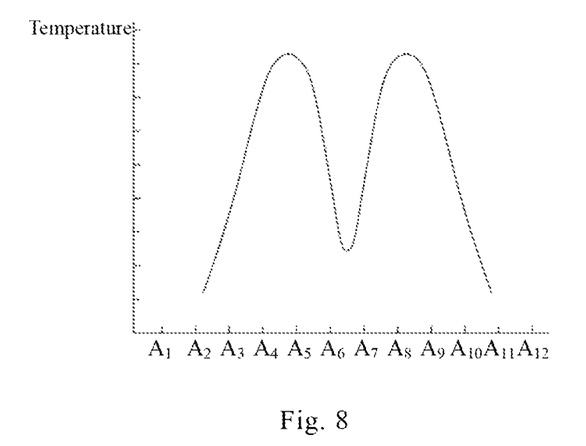
FIG. 8 is a schematic view of a thermal sensing distribution curve corresponding to FIG. 7.

Step 2022: when the current thermal sensing distribution curve has two peaks, the current detecting mode is determined to be the second detecting mode. For example, as shown in FIGS. 7 and 8, the touch operation by the user is a touch operation with two fingers, so the second detecting mode corresponding to the thermal sensing distribution curve with two peaks is determined to be the current detecting mode.

Step 2023: and so on, when the current thermal sensing distribution curve has N peaks, the current detecting mode is determined to be the $N^{th}$ detecting mode. The current thermal sensing distribution curve has N peaks corresponds to the $N^{th}$ detecting mode. The specific content is similar to steps 2021 and 2022, and will not be repeated here.

Third Embodiment

Figure 9:
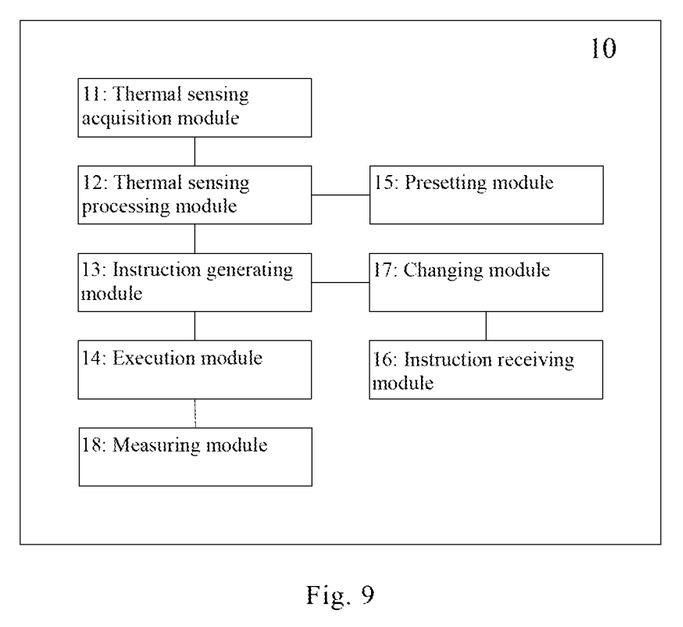
FIG. 9 is a structure view of a wearable device provided in a third embodiment of the present disclosure.

With reference to FIG. 9, specifically, the wearable device 10 in the above embodiment may further include an instruction receiving module 16 for receiving a mode changing instruction from the user and a changing module 17 for changing a detection parameter of the detecting mode, which enables the wearable device 10 to be configurable and further improves the flexibility of the touch operation, as well as a measuring module 18 for measuring a detecting parameter of the current detecting mode.

Here, the instruction receiving module 16 is used for receiving a detecting mode changing instruction. The instruction receiving module 16 may communicate with the outside using a communication technique such as Bluetooth and wireless network. The detecting mode changing instruction is used for changing a detecting parameter of the detecting mode. The detecting parameter may be a detecting parameter required to be measured in the detecting mode. For example, for a wearable device 10 applied in the field of medicine, the detecting parameter may be heartbeat, pulse, blood pressure, sleep time, etc.

The changing module 17 is used for changing a detecting parameter of the detecting mode according to the detecting mode changing instruction. For example, for the wearable device 12 applied in the field of medicine, the detecting parameters corresponding to the detecting mode D include sleep time and blood pressure. When the instruction receiving module 16 receives a detecting mode changing instruction instructing changing the detecting parameter corresponding to the detecting mode D to sleep time, the changing module 17 changes the detecting parameter corresponding to the detecting mode D to sleep time, such that the wearable device 10 only detects sleep time when the detecting mode D is invoked.

The measuring module 18 is used for measuring one or more detecting parameters corresponding to the current detecting mode when the current detecting mode runs. The measuring module 18 is associated with the detecting parameter of the current detecting mode. For example, if the detecting parameter required to be detected in the current detecting mode is sleep time, a measuring module 18 for detecting sleep time is invoked, and if the detecting parameters required to be detected in the current detecting mode are sleep time and blood pressure, a measuring module 18 for detecting sleep time and a measuring module 18 for detecting blood pressure are invoked.

Figure 10:
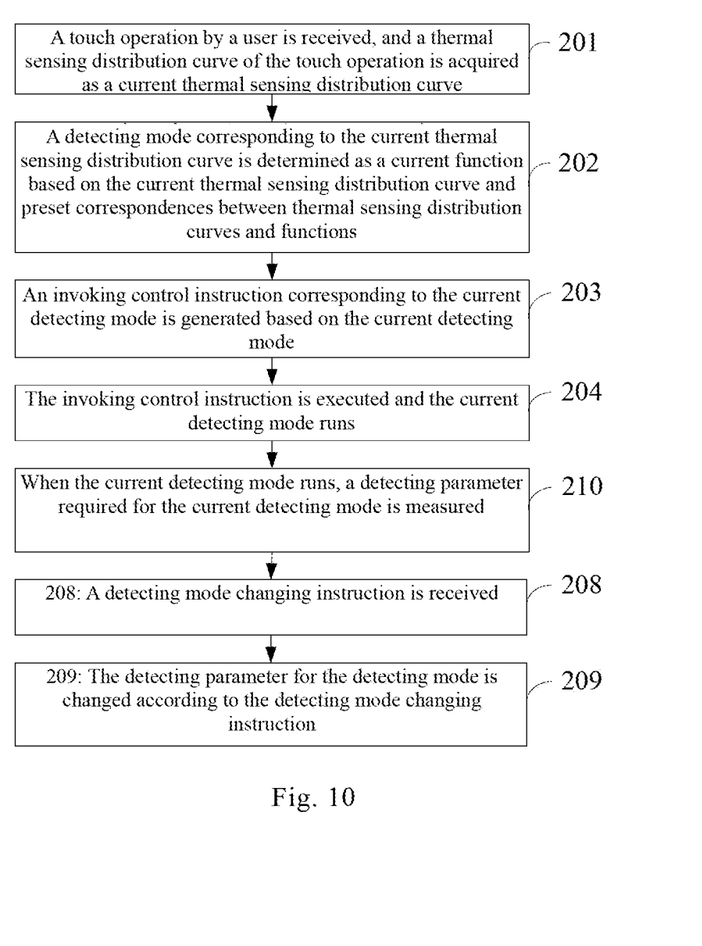
FIG. 10 is a flow chart of a method of controlling a wearable device provided in the third embodiment of the present disclosure.

With reference to FIG. 10, corresponding to the instruction receiving module 16, the changing module 17 and the measuring module 18 of the wearable device 10 in the above embodiment, on the basis of the first embodiment, the method of controlling a wearable device 10 may further include steps 208, 209 and 210 as follows.

Step 208: a detecting mode changing instruction is received. Specifically, the wearable device 10 can receive a detecting mode changing instruction from another control terminal. The detecting mode changing instruction is used for changing a detecting parameter of the detecting mode. For example, the control terminal may be a mobile phone, which may receive a customized operation from the user and sends a detecting mode changing instruction for changing the detecting parameter in the wearable device 10 to the wearable device 10.

Step 209: the detecting parameter of the detecting mode is changed according to the detecting mode changing instruction.

Step 210: when the current detecting mode runs, a detecting parameter required for the current detecting mode is measured.

The specific content of steps 208 to 210 may be described with reference to the description of the instruction receiving module 16, the changing module 17 and the measuring module 18 of the wearable device 10 and will not be repeated here. It is noted that steps 208 to 209 and steps 201 to 204 are independent of each other and thus do not have any specific sequential relationship. FIG. 7 only illustrates one possible sequential relationship, while other sequential relationships between steps 208 to 209 and steps 201 to 204 which can realize the present disclosure are also within the scope of the present disclosure.

Fourth Embodiment

Figure 11:
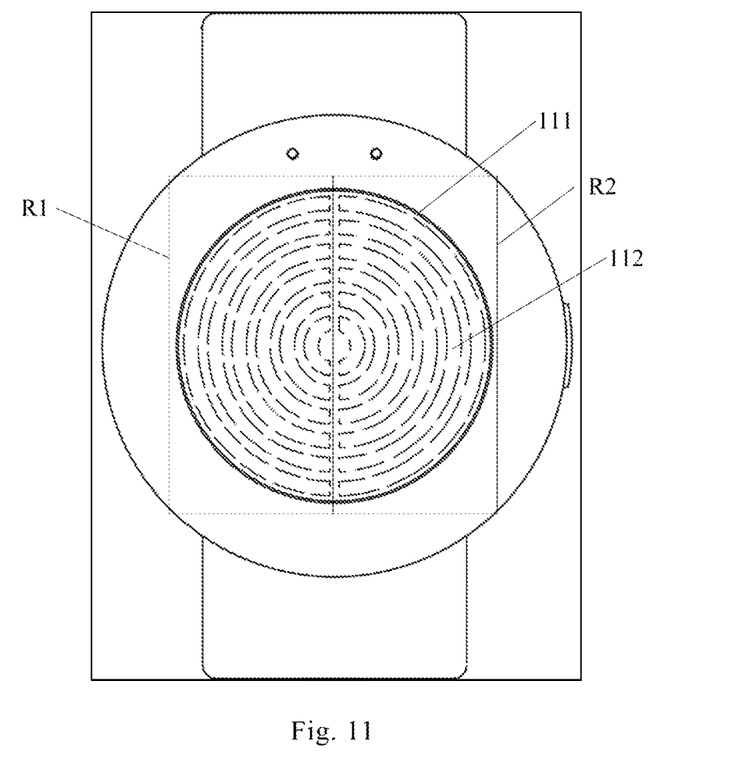
FIG. 11 is a structure view of a wearable device provided in a fourth embodiment of the present disclosure.
Figure 12:
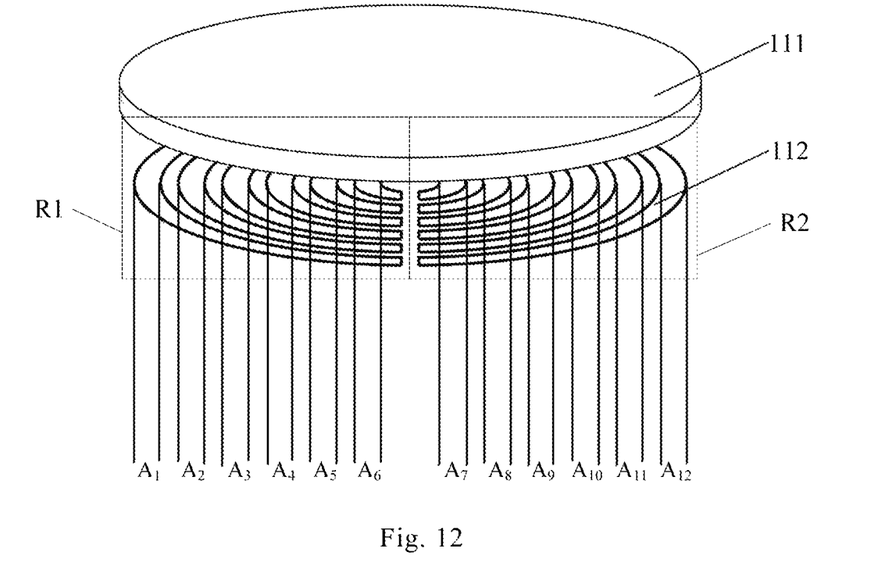
FIG. 12 is a structure view of a metal electrode layer and a thermistor layer provided in the fourth embodiment of the present disclosure.

With reference to FIGS. 11 and 12, a specific structure of the wearable device 10 is shown in FIG. 11. However, embodiments of the present disclosure are not limited to the specific structure of the wearable device 10 in FIG. 11. The thermal sensing acquisition module 11 in the first to third embodiments includes a metal electrode layer 111 and a thermistor layer 112 located under the metal electrode layer 111, as well as an insulating heat-conducting adhesive layer interposed between the metal electrode layer 111 and the thermistor layer 112 and used for bonding the metal electrode layer 111 and the thermistor layer 112. The insulating heat-conducting adhesive layer is not shown in FIGS. 11 and 12 since its thickness is very small. The metal electrode layer 111 can conduct the heat during the touch operation by the user to the thermistor layer 112, so that the thermistor layer 112 may generate a thermal sensing distribution curve.

Specifically, in order to enhance the accuracy of the thermal sensing distribution curve generated by the thermistor layer 112, the thermistor layer 112 includes at least two thermistor portions separated from each other, e.g., thermistor portions R1 and R2 as shown in FIGS. 11 and 12. Each thermistor portion consists of multiple broken line or curved line-shaped thermistors of similar shapes and sequentially increasing lengths encircling one after another, any two of which are separated from each other. Specifically, the broken line shape may be an acute-angle, right-angle, obtuse-angle or broken-line wavy shape. The curved line shape may be a semi-circular, semi-elliptical or curved wavy shape. For example, as shown in FIG. 12, the thermistor portions R1 and R2 have the same shape and size. The thermistor portions R1 and R2 each consists of multiple semi-circular thermistors with sequentially increasing lengths encircling one after another. The thermistor portion R1 consists of semi-circular thermistors $A_1$ to $A_6$, any two of which are separated from each other. The thermistor portion R2 consists of semi-circular thermistors $A_7$ to $A_{12}$, any two of which are separated from each other. When the heat of the touch operation by the user is conducted to the thermistor layer 112, since the thermistors $A_1$ to $A_{12}$ are separated from each other, it may be deduced apparently which thermistors receive relatively more heat from the thermal sensing distribution curve. Thus, different touch operations may be identified according to different thermal sensing distribution curves, so as to invoke different detecting modes. For example, as shown in FIGS. 5 and 6, the touch operation with one finger in FIG. 5 makes the heat mainly concentrated between the thermistors $A_4$ to $A_{11}$, with the thermistors $A_7$ and $A_8$ receiving the most heat. As shown in FIGS. 7 and 8, the touch operation with two fingers in FIG. 7 makes the heat concentrated between the thermistors $A_2$ to $A_{11}$, with the thermistors $A_4$ to $A_5$ and $A_8$ to $A_9$ receiving the most heat. Thus, different touch operations may be accurately identified according to the thermal sensing distribution curves. And different detecting functions may be performed based on different thermal sensing distribution curves in a single touch operation.

In addition, in order to achieve the functions of insulation and heat-conduction of the insulating heat-conducting adhesive layer interposed between the metal electrode layer 111 and the thermistor layer 112, the shape and size of the insulating heat-conducting adhesive layer may be the same as that of the metal electrode layer 111. For example, when the metal electrode layer 111 is a circular disk-like metal electrode, the insulating heat-conducting adhesive layer has the same shape and size as the circular disk-like metal electrode. In view of economizing on the usage of the insulating heat-conducting adhesive in the insulating heat-conducting adhesive layer and enhancing the accuracy of the thermal sensing distribution curve, the insulating heat-conducting adhesive layer may include multiple linear-shaped insulating heat-conducting adhesives which correspond to the broken line or curved line-shaped thermistors in a one-to-one corresponding relationship. In other words, the insulating heat-conducting adhesive layer only covers the surface of the broken line or curved line-shaped thermistors, and the linear-shaped insulating heat-conducting adhesives in the insulating heat-conducting adhesive layer are also separated from each other. This reduces the heat diffused to the surroundings from the insulating heat-conducting adhesive layer and thus enhances the accuracy of the thermal sensing distribution curve.

In the description of the above embodiments, specific features, structures, materials and characteristics may be combined in appropriate manners in any one or more embodiments or examples.

The above description is merely specific implementation of the present disclosure, the scope of which is not limited thereto. The variations and alternatives which may be easily conceived by a skilled person in the art in the technical scope disclosed by the present disclosure are within the scope of the present disclosure. Therefore, the scope of protection of the present disclosure is defined in the appended claims.

What is claimed is:

1. A wearable device, comprising:
   a thermal sensing acquisition module configured to receive a touch operation by at least one finger of a user, and acquire a thermal sensing distribution curve of the touch operation as a current thermal sensing distribution curve, the thermal sensing acquisition module comprising a thermistor layer, wherein the thermal sensing distribution curve represents a distribution of heat generated by the touch operation on the thermistor layer and has at least one peak corresponding to the number of the at least one finger;
   a thermal sensing processing module configured to determine an operation mode corresponding to the number of the peaks of the current thermal sensing distribution curve as a current operation mode based on the current thermal sensing distribution curve and preset corresponding relationships between a set of thermal sensing distribution curves and a set of operation modes;
   an instruction generating module configured to generate an invoking control instruction corresponding to the current operation mode according to the current operation mode; and
   an execution module configured to execute the invoking control instruction to perform the current operation mode;
   wherein the thermal sensing acquisition module further comprises a metal electrode layer on the thermistor layer, and an insulating heat-conducting adhesive layer between the metal electrode layer and the thermistor layer;
   wherein the thermistor layer comprises at least two thermistor portions which are separated from each other, wherein each thermistor portion consists of multiple broken line or curved line-shaped thermistors with similar shapes and sequentially increasing lengths encircling one after another, any two of the broken line or curved line-shaped thermistors being separated from each other;

wherein the insulating heat-conducting adhesive layer comprises multiple linear-shaped insulating heat-conducting adhesives, the linear-shaped insulating heat-conducting adhesives corresponding to the broken line or curved line-shaped thermistors in a one-to-one manner.

2. The wearable device according to claim 1, wherein the set of operation modes is a set of detecting modes.

3. The wearable device according to claim 2, further comprising:
a presetting module configured to preset thermal sensing distribution curves which respectively have 1 through N peaks to correspond to a first through $N^{th}$ detecting modes respectively, where N is a positive integer,
wherein the thermal sensing processing module is further configured to, when the current thermal sensing distribution curve has n peaks, determine a current detecting mode to be an $n^{th}$ detecting mode, where n is a positive integer and $1 \leq n \leq N$.

4. The wearable device according to claim 2, further comprising:
at least one measuring module configured to, when a current detecting mode runs, measure one or more detecting parameters corresponding to the current detecting mode.

5. The wearable device according to claim 2, further comprising:
an instruction receiving module configured to receive a detecting mode changing instruction for changing a detecting parameter of the detecting mode; and
a changing module configured to change the detecting parameter of the detecting mode according to the detecting mode changing instruction.

6. The wearable device according to claim 1, wherein the insulating heat-conducting adhesive layer has the same shape and size as the metal electrode layer.

7. A method of controlling a wearable device according to claim 1, comprising:
receiving a touch operation by at least one finger of a user, and acquiring a thermal sensing distribution curve of the touch operation as a current thermal sensing distribution curve, wherein the thermal sensing distribution curve represents a distribution of heat generated by the touch operation on at least two thermistor portions of a thermistor layer and has at least one peak corresponding to the number of the at least one finger;

determining an operation mode corresponding to the number of the peaks of the current thermal sensing distribution curve as a current operation mode based on the current thermal sensing distribution curve and preset corresponding relationships between a set of thermal sensing distribution curves and a set of operation modes;
generating an invoking control instruction corresponding to the current operation mode according to the current operation mode; and
executing the invoking control instruction to perform the current operation mode.

8. The method of controlling a wearable device according to claim 7, wherein the set of operation modes is a set of detecting modes.

9. The method of controlling a wearable device according to claim 8, wherein the method further comprises, prior to determining a detecting mode corresponding to the current thermal sensing distribution curve as a current detecting mode based on the current thermal sensing distribution curve and preset corresponding relationships between thermal sensing distribution curves and detecting modes:
presetting thermal sensing distribution curves which respectively have 1 through N peaks to correspond to a first through $N^{th}$ detecting modes respectively, where N is a positive integer,
wherein the determining a detecting mode corresponding to the current thermal sensing distribution curve as a current detecting mode based on the current thermal sensing distribution curve and preset corresponding relationships between thermal sensing distribution curves and detecting modes comprises:
when the current thermal sensing distribution curve has n peaks, determining the current detecting mode to be an $n^{th}$ detecting mode, where n is a positive integer and $1 \leq n \leq N$.

10. The method of controlling a wearable device according to claim 8, further comprising:
when a current detecting mode runs, measuring one or more detecting parameters corresponding to the current detecting mode.

11. The method of controlling a wearable device according to claim 8, further comprising:
receiving a detecting mode changing instruction for changing a detecting parameter of the detecting mode; and
changing the detecting parameter of the detecting mode according to the detecting mode changing instruction.

* * * * *